United States Patent
Martinez et al.

(10) Patent No.: US 9,575,791 B2
(45) Date of Patent: Feb. 21, 2017

(54) UNIFIED EXTENSIBLE FIRMWARE INTERFACE SYSTEM MANAGEMENT MODE INITIALIZATION PROTECTIONS WITH SYSTEM MANAGEMENT INTERRUPT TRANSFER MONITOR SANDBOXING

(71) Applicant: Dell Products, LP, Round Rock, TX (US)

(72) Inventors: Ricardo L. Martinez, Leander, TX (US); Allen C. Wynn, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 402 days.

(21) Appl. No.: 14/178,729

(22) Filed: Feb. 12, 2014

(65) Prior Publication Data

US 2015/0227385 A1 Aug. 13, 2015

(51) Int. Cl.
| | |
|---|---|
| *G06F 13/20* | (2006.01) |
| *G06F 9/455* | (2006.01) |
| *G06F 13/24* | (2006.01) |
| *G06F 21/53* | (2013.01) |
| *G06F 9/44* | (2006.01) |

(52) U.S. Cl.
CPC ......... *G06F 9/45558* (2013.01); *G06F 9/4401* (2013.01); *G06F 13/24* (2013.01); *G06F 21/53* (2013.01); *G06F 9/4411* (2013.01); *G06F 9/45533* (2013.01); *G06F 2009/45579* (2013.01)

(58) Field of Classification Search
CPC .... G06F 9/4401; G06F 9/45558; G06F 21/53; G06F 13/24; G06F 9/45533; G06F 9/4411; G06F 2009/45579
USPC ........................................................ 710/313
See application file for complete search history.

(56) References Cited

U.S. PATENT DOCUMENTS

| | | | |
|---|---|---|---|
| 7,543,166 B2 * | 6/2009 | Zimmer | ............... G06F 9/45533 713/310 |
| 8,448,255 B2 | 5/2013 | Jothimani | |
| 2007/0050854 A1 * | 3/2007 | Cooperstein | ............ G06F 21/53 726/30 |
| 2009/0327741 A1 | 12/2009 | Zimmer et al. | |
| 2012/0260082 A1 | 10/2012 | Bobzin | |
| 2013/0104188 A1 | 4/2013 | Western et al. | |
| 2013/0124843 A1 | 5/2013 | Bobzin | |

* cited by examiner

*Primary Examiner* — Chun-Kuan Lee
(74) *Attorney, Agent, or Firm* — Larson Newman, LLP

(57) ABSTRACT

An information handling system includes a processor configured to trap system management interrupts (SMIs) via a system management mode transfer monitor (STM), a first system resource, a SMI handler configured to operate within the STM, launch a first system management mode (SMM) virtual machine, load first SMM code for a first driver into the first SMM virtual machine, and associate the first SMM virtual machine with the first system resource and not with the second system resource.

17 Claims, 4 Drawing Sheets

UNIFIED EXTENSIBLE FIRMWARE INTERFACE SYSTEM MANAGEMENT MODE INITIALIZATION PROTECTIONS WITH SYSTEM MANAGEMENT INTERRUPT TRANSFER MONITOR SANDBOXING

FIELD OF THE DISCLOSURE

This disclosure relates generally to information handling systems, and more particularly relates to unified extensible firmware interface (UEFI) system management mode (SMM) initialization protections with system management interrupt (SMI) transfer monitor (STM) sandboxing.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A unified extensible firmware interface (UEFI) can provide an interface between the hardware and firmware of the information handling system and an operating environment of the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
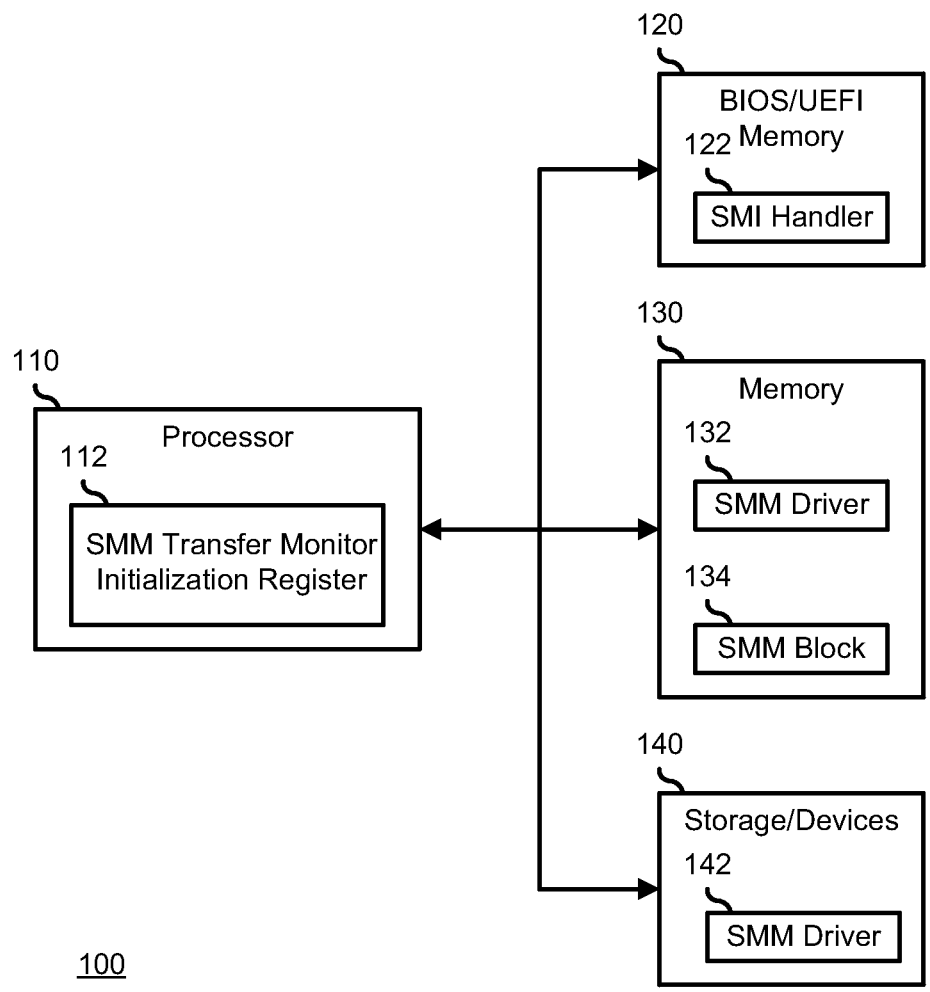
FIG. 1 is a block diagram of an information handling system according to an embodiment of the present disclosure.

FIG. 1 illustrates an information handling system 100 including a processor 110, a BIOS/UEFI memory 120, a memory 130, and one or more storage and peripheral devices 140. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like Processor 110 includes an SMM transfer monitor (STM) function that is initialized via a STM initialization register 112. The STM function operates to set up a STM virtual machine. Processor 110 then traps system management interrupts (SMIs), and redirects them to the STM virtual machine. BIOS/UEFI memory 120 includes code for implementing a SMI handler 122. In a particular embodiment, BIOS/UEFI memory 120 is a non-volatile random access memory (NV-RAM), such as a flash memory device. Memory 130 includes one or more SMM drivers 132, and storage/devices 140 includes one or more SMM drivers 142.

In a particular embodiment, the STM function is not enabled by STM initialization register 112. Here, SMI handler 122 operates to load SMM drivers 132 and 142 into a SMM block 134, which is a portion of memory 130 that is allocated for SMM operations. In another embodiment, the STM function is enabled by STM initialization register 112, and SMI handler 122 operates to launch the STM virtual machine, in, for example, SMM block 134, and the STM virtual machine installs the SMI handler as a guest on the STM virtual machine. When SMM drivers 132 and 142 are to be loaded, SMI handler 122 imports the drivers into the STM virtual machine. Then, when processor 110 receives a SMI, the processor directs the SMI to the STM virtual machine and the SMI is serviced out of the STM virtual machine.

In another embodiment, described more fully below with respect to FIG. 3, the STM function is enabled by STM initialization register 112, and SMI handler 122 operates to launch the STM virtual machine. The STM virtual machine installs the SMI handler as a guest on the STM virtual machine, and the SMI handler provides SMM resource policies within the STM virtual machine. Here, SMM drivers 132 and 142 are identified by a globally unique identification (GUID), signature, or other mechanism, and are evaluated based on a build-time resource policy or a resource arbitration interface to determine the resources associated with each driver. The policies define the specific resources of information handling system 100 that are available to respective SMM drivers 132 and 142. For example, a network driver can have a policy that identifies a network card's PCI configuration space, and a portion of memory 130 that is allocated for network DMA transfers. Once the policies for SMM drivers 132 and 134 are identified, the drivers are instantiated as separate SMM virtual machines in SMM block 134.

In this embodiment, when processor 110 receives a SMI, the processor directs the SMI to the STM virtual machine, and the STM virtual machine sets up virtual machine traps for all resource accesses and evaluates the virtual machine traps against the policies. If a resource access included in an SMI corresponds with the resources allocated to the particular SMM driver, then the STM virtual machine redirects the SMI to the associated SMM virtual machine, and the SMM virtual machine handles the SMI. If the resource access included in the SMI does not correspond with the resources allocated to the SMM driver, then the STM virtual machine denies access to the resource included in the SMI. In this way, SMI handler 122, SMM driver 132, and SMM driver 142 are sandboxed from each other.

Figure 2:
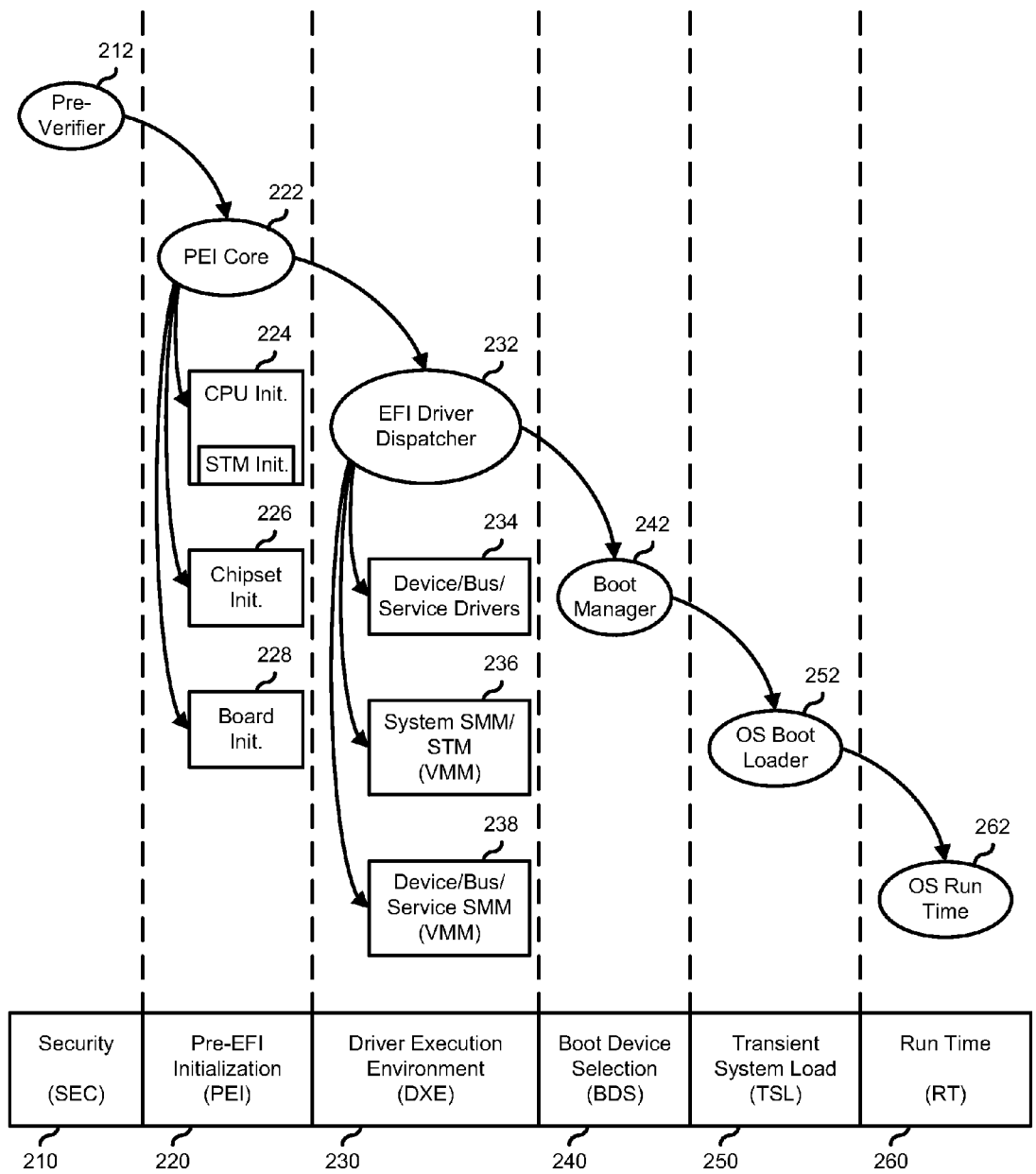
FIG. 2 is a phase diagram for a UEFI boot of the information handling system of FIG. 1.

FIG. 2 illustrates a phase diagram 200 for an information handling system that operates using a UEFI, including a security phase (SEC) 210, a pre-EFI initialization phase (PEI) 220, a driver execution environment phase (DXE) 230, a boot device selection phase (BDS) 240, a transient system load phase (TSL) 250, and a run time phase (RT) 260. SEC 210 is the first phase of a UEFI boot process on the information handling system that operates to set up a pre-verifier 212. Pre-verifier 212 handles all restart events on the information handling system, and temporarily allocates a portion of memory for use during the other boot phases. SEC 220 is executed out of the firmware resident on the information handling system, and so serves as a root of trust for the system.

SEC 210 passes execution to PEI 220 which initializes the system memory for the information handling system. PEI 220 includes CPU initialization 224, chipset initialization 226, and board resource initialization 228. In the embodiments where the STM function is enabled, a STM initialization register is loaded during CPU initialization 224. PEI 220 passes execution to DXE 230 which performs device specific initializations for the information handling system. In particular, DXE 230 executes an EFI driver dispatcher 232 that operates to load device, bus, and service drivers 234, to instantiate the system SMI handler in the STM 236, and to instantiate virtual machines associated with the device, bus, and service SMMs 238. DXE 230 passes execution to BDS 240 executes a boot manager 242 which identifies a boot target, and passes execution to TSL 250. TSL 250 launches an OS boot loader 252 which loads the operating system, and passes execution to the operating system at RT 260.

Figure 3:
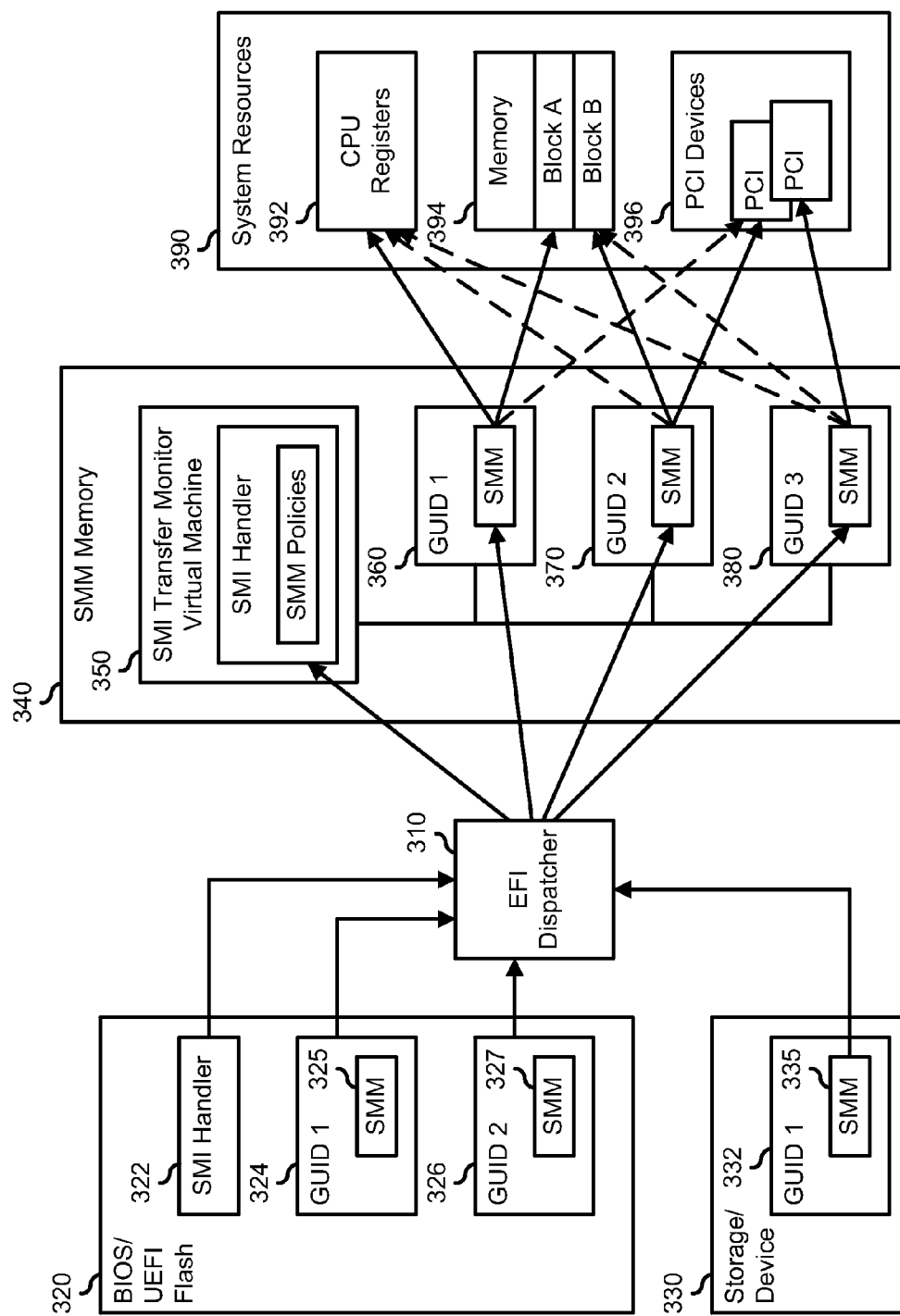
FIG. 3 is a block diagram illustrating SMM initialization in an information handling system, including a method for UEFI SMM initialization protections with STM sandboxing according to an embodiment of the present disclosure.

FIG. 3 illustrates SMM initialization in an information handling system 300 similar to information handling system 100, including an EFI dispatcher 310, a BIOS/UEFI memory 320, one or more storage and peripheral devices 330, a SMM memory block 340, and system resources 390. EFI dispatcher 310 operates to load device, bus, and service drivers, to instantiate a system SMI handler in a STM, and to instantiate virtual machines associated with the device, bus, and service SMMs, as described below. BIOS/UEFI memory 320 is similar to BIOS/UEFI memory 120, and includes a SMI handler 322, a driver 324 which includes SMM code 325, and a driver 326 which includes SMM code 327. Storage/devices 330 is similar to storage/devices 140, and includes a driver 332 which includes SMM code 335. System resources 390 includes CPU registers 392, memory 394, and PCI devices 396. The elements of SMM memory 340 will be described below.

FIG. 3 also illustrates a method for UEFI SMM initialization protections with STM sandboxing according to an embodiment of the present disclosure. Here, it is assumed that a STM initialization register similar to STM initialization register 112 has been initialized during a PEI phase of the UEFI boot process to enable the STM function of a CPU of information handling system 100. Here, a DXE phase of the UEFI boot process has invoked EFI dispatcher 310 to load device, bus, and service drivers, to instantiate a system SMI handler in a STM, and to instantiate virtual machines associated with the device, bus, and service SMMs. Here, EFI dispatcher 310 obtains SMI handler 322 from BIOS/UEFI memory 320, launches a STM virtual machine 350 in SMM memory 340, and installs the SMI handler as a guest in the STM virtual machine.

When EFI dispatcher 310 loads a driver, such as driver 324, and the driver load process comes to loading SMM code 325, the EFI dispatcher provides the SMM code to STM virtual machine 350, and the SMI handler determines a GUID or signature for the driver and evaluates the resource needs of the driver. The evaluation can be based on a build-time resource policy or a resource arbitration interface, as needed or desired. A SMM virtual machine 360 is instantiated for driver 324, and SMM code 325 is launched in the virtual machine. Here, SMM virtual machine 360 is illustrated as having access to one or more of CPU registers 392, and to a first block of memory 394, and as having no access to PCI devices 396. Similarly, when EFI dispatcher 310 loads driver 326, the EFI dispatcher provides SMM code 327 to STM virtual machine 350, and the SMI handler determines a GUID or signature for the driver and evaluates the resource needs of the driver, instantiates a SMM virtual machine 370 for the driver, and launches SMM code 327 in the virtual machine. SMM virtual machine 370 is illustrated as having access to a second block of memory 394 and to one or more of PCI devices 396, and as having no access to CPU registers 392. Finally, when EFI dispatcher 310 loads driver 332, the EFI dispatcher provides SMM code 335 to STM virtual machine 350, and the SMI handler determines a GUID or signature for the driver and evaluates the resource needs of the driver, instantiates a SMM virtual machine 380 for the driver, and launches SMM code 335 in the virtual machine. SMM virtual machine 380 is illustrated as having access to one or more of PCI devices 396, and as having no access to CPU registers 392 and to memory 394.

When the processor receives a SMI, the processor directs the SMI to STM virtual machine 350, and the SMI handler sets up virtual machine traps for all resource accesses and evaluates the virtual machine traps against the policies. If a resource access included in an SMI corresponds with the resources allocated to the particular SMM driver, then the STM virtual machine redirects the SMI to the associated SMM virtual machine, and the SMM virtual machine handles the SMI. If the resource access included in the SMI does not correspond with the resources allocated to the SMM driver, then the STM virtual machine denies access to the resource included in the SMI. In a particular embodiment, when the SMI handler is launched on STM virtual machine 350, the SMI handler operates as a virtual machine manager to instantiate virtual machines 360, 370, and 380.

Figure 4:
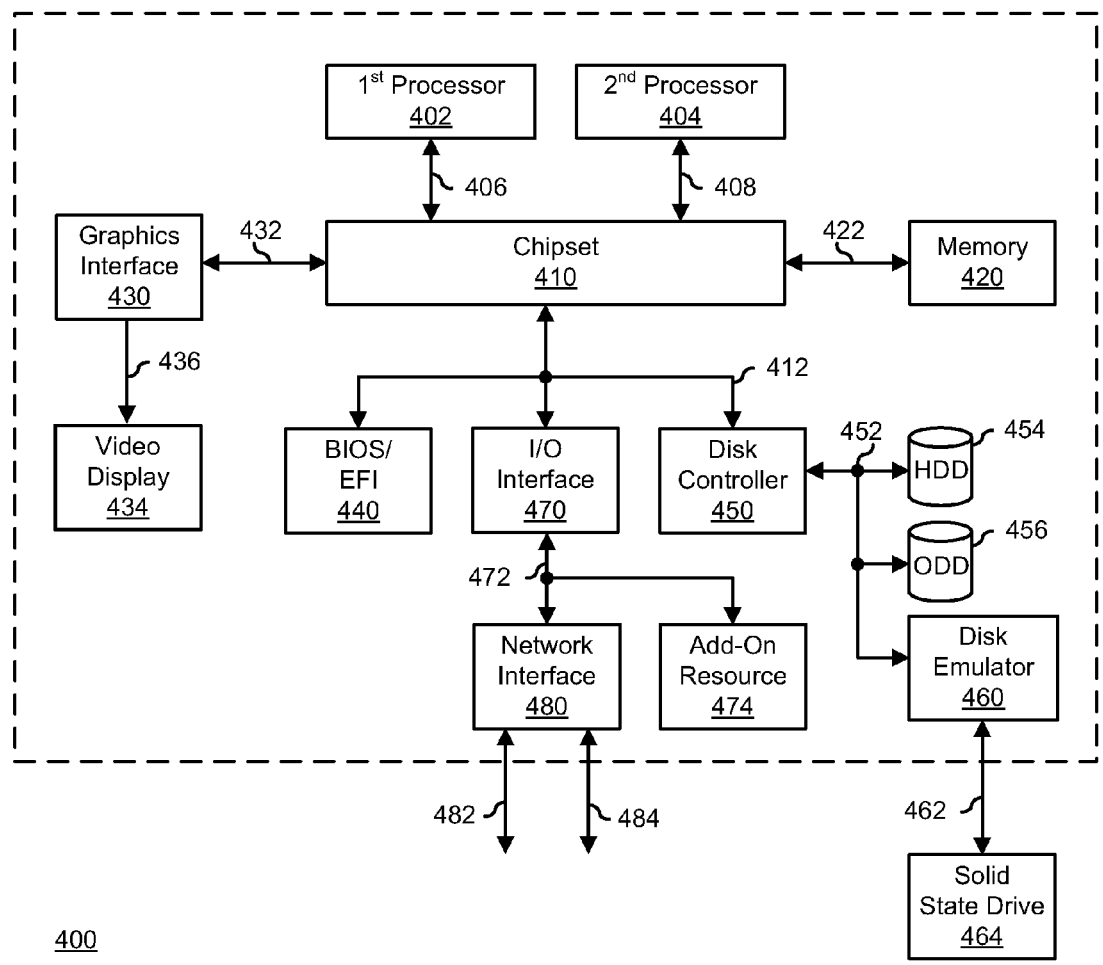
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474 and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a processor configured to trap system management interrupts (SMIs) via a system management mode transfer monitor (STM);
a first system resource;
a second system resource; and
an SMI handler configured to:
operate within the STM;
launch a first system management mode (SMM) virtual machine;
load first SMM code for a first driver into the first SMM virtual machine;
associate the first SMM virtual machine with the first system resource and not with the second system resource;
receive a first SMI;
determine that the first SMI is a call to the first SMM code and is targeted to the first system resource;
forward the first SMI to the first SMM virtual machine;
receive a second SMI;
determine that the second SMI is a call to the first SMM code and is targeted to the second system resource; and
handle the second SMI without forwarding the second SMI to the first SMM virtual machine.

2. The information handling system of claim 1, wherein the SMI handler is further configured to:
determine a resource policy for the first driver, the resource policy defining that the first SMM virtual machine should be associated with the first system resource and not with the second system resource;
wherein associating the first SMM virtual machine with the first system resource and not with the second system resource is based upon the resource policy.

3. The information handling system of claim 2, wherein the resource policy is determined based upon the first driver.

4. The information handling system of claim 3, wherein the resource policy is determined based upon a globally unique identifier of the first driver.

5. The information handling system of claim 1, wherein the SMI handler is further configured to:
launch a second SMM virtual machine;
load second SMM code for a second driver into the second SMM virtual machine; and
associate the first SMM virtual machine with the second system resource and not with the first system resource.

6. The information handling system of claim 1, wherein, in handling the second SMI, SMI handler is further configured to deny the second SMI access to the second system resource.

7. A method comprising:
launching, on an information handling system, a system management interrupt (SMI) handler within a system management mode transfer monitor (STM);
launching, by the SMI handler, a first system management mode (SMM) virtual machine in a memory of the information handling system;
loading first SMM code for a first driver into the first SMM virtual machine;
associating the first SMM virtual machine with a first system resource of the information handling system and not with a second system resource of the information handling system;
receiving, by the SMI handler, a first SMI;
determining that the first SMI is a call to the first SMM code and is targeted to the first system resource;
forwarding the first SMI to the first SMM virtual machine;
receiving, by the SMI handler, a second SMI;
determining that the second SMI is a call to the first SMM code and is targeted to the second system resource; and
handling, by the SMI handler, the second SMI without forwarding the second SMI to the first SMM virtual machine.

8. The method of claim 7, further comprising:
determining, by the SMI handler, a resource policy for the first driver, the resource policy defining that the first SMM virtual machine should be associated with the first system resource and not with the second system resource;
wherein associating the first SMM virtual machine with the first system resource and not with the second system resource is based upon the resource policy.

9. The method of claim 8, wherein the resource policy is determined based upon the first driver.

10. The method of claim 9, wherein the resource policy is determined based upon a globally unique identifier of the first driver.

11. The method of claim 7, further comprising:
launching, by the SMI handler, a second SMM virtual machine in the memory;
loading second SMM code for a second driver into the second SMM virtual machine; and
associating the second SMM virtual machine with the second system resource and not with the first system resource.

12. The method of claim 7, wherein, in handling the second SMI, the method further comprises:

denying, by the SMI handler, the second SMI access to the second system resource.

13. A non-transitory computer-readable medium including code for performing a method, the method comprising:
launching, on an information handling system, a system management interrupt (SMI) handler within a system management mode transfer monitor (STM);
launching, by the SMI handler, a first system management mode (SMM) virtual machine in a memory of the information handling system;
loading first SMM code for a first driver into the first SMM virtual machine;
associating the first SMM virtual machine with a first system resource of the information handling system and not with a second system resource of the information handling system;
receiving, by the SMI handler, a first SMI;
determining that the first SMI is a call to the first SMM code and is targeted to the first system resource;
forwarding the first SMI to the first SMM virtual machine;
receiving, by the SMI handler, a second SMI;
determining that the second SMI is a call to the first SMM code and is targeted to the second system resource; and
handling, by the SMI handler, the second SMI without forwarding the second SMI to the first SMM virtual machine.

14. The computer-readable medium of claim 13, the method further comprising:
determining, by the SMI handler, a resource policy for the first driver, the resource policy defining that the first SMM virtual machine should be associated with the first system resource and not with the second system resource;
wherein associating the first SMM virtual machine with the first system resource and not with the second system resource is based upon the resource policy.

15. The computer-readable medium of claim 14, wherein the resource policy is determined based upon the first driver.

16. The computer-readable medium of claim 15, wherein the resource policy is determined based upon a globally unique identifier of the first driver.

17. The computer-readable medium of claim 13, wherein, in handling the second SMI, the method further comprises:
denying, by the SMI handler, the second SMI access to the second system resource.

* * * * *